United States Patent [19]

Huang et al.

[11] Patent Number: 4,891,803

[45] Date of Patent: Jan. 2, 1990

[54] PACKET SWITCHING NETWORK

[75] Inventors: Alan Huang, Middletown; Scott C. Knauer, Mountainside; Jay H. O'Neill, Freehold; Charles W. Rutledge, Whitehouse, all of N.J.; Sheng L. Lin, Lisle, Ill.; Maurice N. Ransom, Plainfield, Ill.; Ronald A. Spanke, Wheaton, Ill.

[73] Assignees: American Telephone and Telegraph Company; AT&T Bell Laboratories, both of Murray Hill, N.J.

[21] Appl. No.: 267,606

[22] Filed: Nov. 7, 1988

[51] Int. Cl.$^4$ ................................................. H04J 3/26
[52] U.S. Cl. ......................................... 370/60; 370/61
[58] Field of Search .................... 370/60, 61, 94, 56

[56] References Cited

U.S. PATENT DOCUMENTS

| | | | |
|---|---|---|---|
| 3,428,946 | 2/1969 | Batcher . | |
| 4,472,801 | 9/1984 | Huang | 370/60 |
| 4,516,238 | 5/1985 | Huang | 370/60 |
| 4,630,258 | 12/1986 | McMillen et al. | 370/60 |
| 4,761,780 | 8/1988 | Bingham et al. | 370/60 |

OTHER PUBLICATIONS

Alan Huang and Scott Knauer, "Starlite: A Wideband Digital Switch", Proceedings of Globecom 84, pp. 121-125.

Primary Examiner—Benedict V. Safourek
Assistant Examiner—Melvin Marcelo
Attorney, Agent, or Firm—Henry T. Brendzel

[57] ABSTRACT

A packet switching network that accommodates the appearance of multiple occurrences of packets addressed to the same destination are accommodated. The network includes a recirculating delay block within the switch, and an expander that includes a modest number of multiple appearances of the same address, followed by memories that accept the packets delivered at those multiple appearances, store the packets, and output the stored packets to the user, one at a time, in accordance with a set priority scheme.

9 Claims, 6 Drawing Sheets

PACKET SWITCHING NETWORK

BACKGROUND OF THE INVENTION

This invention relates to wideband switching systems and, more particularly, to packet switching systems.

With advances in electronic and photonic technologies, the demand for a wider variety of communications services has been steadily increasing. Digital data transmission seems to be the approach of choice, and the industry efforts are aimed at achieving ever wider bandwidth capabilities, both in transmission and in switching.

Communicating information with signal packets is one form of digital communication. A signal packet is a collection of bits that contains information about the packet (such as the destination of the packet) as well as the information that is to be communicated. Thus, digital signal packets normally have a header section that contains the "administrative" information and a body section that contains the data. In some embodiments, signal packets contain a trailer section, or both a header and a trailer section. The header section normally contains the destination address and other information bits, such as whether the packet contains information, whether the packet is blank, whether the packet contains signaling data, etc.

In U.S. Pat. No. 4,516,238 issued May 7, 1985, a wideband packet switching network was disclosed. It performs packet switching through network elements that permit the packets to route themselves to their desired destinations. These elements are a concentrator, a sorting network, a trap network, and an expander. In one embodiment, packets of a predetermined length are applied synchronously to the concentrator. The destination addresses and the activity status within the packets are compared to each other, and based on those comparisons the packets are routed so that the signals at the output ports of the concentrator form two contiguous sets--the set with active signal packets, and the set of blank or inactive signal packets. The sorting network that follows sorts the active packet signals at the output of the concentrator in the order of destination addresses. The trap network insures that no two packets are destined to the same address. It insures this condition by deactivating (and thereby abandoning) all but one such packet. Lastly, the expander takes the ordered and consecutively placed packets at the output of the trap network and routes the packets, according to their destination address, to the proper output port (destination). This is very efficient and cost effective design for those applications where only one source can communicate at any one time with a chosen destination. A conventional telephone connection is one such application.

In U.S. Pat. No. 4,472,801, issued Sept. 18, 1984, a distributed prioritized concentrator is disclosed. The system described there is directed to efficient communication of packets through a communication channel. Such a channel, it is assumed, is intentionally designed to have the capacity less than that required to carry all packets at all times. If the channel had been designed to handle the maximum offered load, then at less loaded times the channel would be under utilized and less cost effective. To overcome the bottleneck problem that would occur when more packets seek to be transmitted than the transmission capacity would allow, a merge network is provided at the channel input that forwards the packets that the channel can handle, and sends the overflow packets to a delay memory. The memory places those packets at the input of the merge network to allow them another chance to be transmitted. Means are also disclosed for improving the chances recirculated packets have to be transmitted via a time stamp priority schema. This system is very useful in telephone trunk applications, where it is desired to pass through as many packets as the trunk would allow, and the exact line on which the packets flow is not important.

Thus, the prior art shows that one can abandon concurrent packets that seek to be transmitted to a destination that is temporarily "spoken for," and the prior art also shows that one can postpone the sending of a packet when a channel is "occupied", with the postponing being effected by means of a delay memory that recirculates the packets. Unfortunately, neither method offers an ideal solution when one wishes to permit many packets that are destined to the same user to peacefully coexist within the switching system.

One suggested approach that does accommodate contemporaneously arriving packets with identical destination addresses is to increase the size of the expander network and to allow a multiple number of "appearances" of the same address to appear at the output of the expander. In this manner a first packet addressed to a certain address would be routed to the first appearance of that address of the expander, the second packet would be routed to the second appearance of that address, and so on. Of course, there would always be the possibility of more packets destined to a particular address than there are appearances of the address, and in that case some packets would have to be abandoned.

SUMMARY OF THE INVENTION

In accordance with the principles of our invention, multiple occurrences of packets addressed to the contemporaneous same destination are accommodated in a packet switch by including a recirculating delay means within the switch, and an expander that includes a modest number of multiple appearances of the same address, followed by memories that accept the packets delivered at those multiple appearances, store the packets, and output the stored packets to the user, one at a time, in accordance with a set priority scheme.

DETAILED DESCRIPTION

Figure 1:
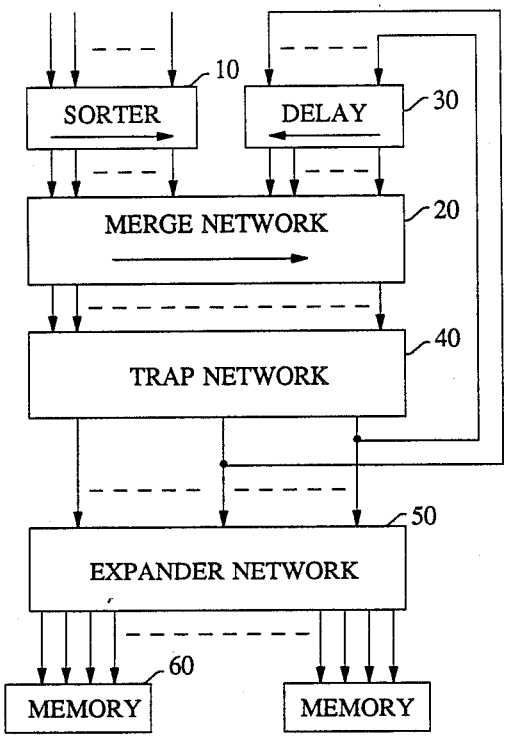
FIG. 1 shows the structure of a packet switching network employing the principles of our invention.

FIG. 1 depicts a block diagram of a switching network embodying the principles of our invention. Sorting network 10 accepts incoming signal packets and sorts those packets according to destination, priority, and time stamp. The time stamp can be initialized (e.g., to all 1's) in the incoming packets. In FIG. 1, a horizontal arrow is shown within sorter 10. This arrow depicts the sort direction of the output. That is, at the base of the arrow (on the left) the sorter outputs the packets that are destined to the lowest destination, and those packets are ordered by priority, startiing with the highest priority, and followed by time stamp priority, starting with the oldest packets. The destination address of the following packets is higher, ending, perhaps, with blank packets that have no destination address. The output of sorter 10 is connected to merge network 20.

Merge network 20 has another source for signal packets, and that source is recirculating delay buffer 30. Buffer 30 also has an arrow shown near its output lines, but its direction is opposite to that of the sorter 10 arrow. The output of delay buffer 30 is sorted in accordance with the shown arrow and, thus, the input packets of merge network 20 form an ascending and a descending sorted list.

Network 20 merges the two lists and outputs the merged result in order (by destination, priority and time stamp), as shown by the arrow near the output lines of the merge network. The output of merge network 20 is applied trap network 40.

The function of trap network 40 is to advance the objective of our invention by allowing a certain maximum number of highest order packets addressed to a particular destination to be allowed to continue on to that destination. Specifically, if that maximum number of packets is N, then the N packets having the highest priority and destined to any particular address are grouped and marked for passage, while the remaining packets that are destined to such addresses are marked for recirculation. This function is accomplished in network 40 by handling the sorted incoming set of packets (sorted by address beginning with the lowest address, then by priority, and then by time stamp) in subsets defined by the destination address. For each subset, network 40 routes the packets to its left-most available outputs (in FIG. 1), up to a maximum of N such packets, and shifts the remaining packets that are of lower priority and time stamp combination to the right-most available outputs of network 40. The packets shifted, or pushed, to the right are also marked for recirculating in specified activity tag bits of the packets' headers.

One may observe that the output of trap network 40 contains (1) packets, starting at the left end, that are destined to be "pass-through" packets; (2) packets, starting at the right end, that are destined to be recirculated; and (3) a variable number of "blank" packets in the middle that form a variable-width "neutral" zone. Both the size and the location of the neutral zone between the two sets of packets are completely dependent of the particular set of incoming packets and on the history of the incoming packets.

Referring again to FIG. 1, a chosen portion of the output ports of network 40 is connected to recirculating buffer 30. Primarily, buffer 30 is a one packet delay which may simply be a set of registers, with each holding a single packet. The size of the portion of trap network 40 outputs that is connected to memory 30 is strictly a design choice, but it is realized that this choice controls the cost and performance of the network. For example, if one expects to handle M incoming packets at a time, then sorter 10 must have M inputs and M outputs. If one believes that no more than half of the packets present within the FIG. 1 network at any one time violate the condition of no more than N packets destined to the same address, then connecting M network 40 outputs to buffer 30, would be a reasonable choice. That, of course, forces network 40 to be 2M wide to permit connection of the M packets from sorter 10 and the M packets from buffer 30.

It is stated above that buffer 30 is primarily a delay memory. In fact, memory 30 must include a preprocessing stage that is keyed to the tag bits. Specifically, packets that appear at the input of buffer 30 that are not destined for recirculation should not be accepted while packets that are destined for recirculation should be appropriately conditioned. This preprocessing is necessary because the M right-most outputs of trap network 40 are connected to delay 30, but the number of packets that need to be connected to delay 30 in variable. Hence it is the function of the tag bits in the packets' headers to "inform" delay 30 of which packets are to be delayed and which packets are to be discarded.

The full set of trap network 40 outputs is connected in FIG. 1 to expander network 50. It is, of course, realized that this is a design choice. One can employ a system where less than the full set of network 40 outputs is applied to expander 50. The outputs of expander 50 are the fixed destination points of the network, and they are divided into sets of N outputs each. That is, the first set (left-most set in FIG. 1) of N outputs of network 50 corresponds to destination address 0, the second set corresponds to destination address 1, etc. The function of expander 50, therefore, is to route the incoming packets that are not designated for recirculation to the appropriate output destination ports. That means that expander 50 must preprocess the incoming packets (to ignore the packets that are to be recirculated) and then it must route the packets in the particular fashion that recognizes the fact that N output ports have the same address.

In accordance with our invention, each set of N outputs of expander 50 is connected to a memory 60, which we call a FIPO memory (first in, priority out). Memory 60 is special only in that it is able to be accessed by the priority of the packet signals contained therein. In a sense, memory 60 is a content addressable memory, in fact memory 60 need not be a FIPO memory. Any memory can be employed as long as it serves as a buffer to allow the insertion at some times of as many as N packets while only one packet at a time is accessed and deleted from the buffer.

Figure 2:
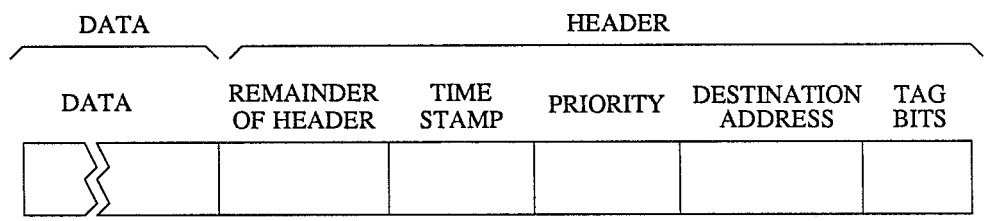
FIG. 2 illustrates the organization of a packet flowing through our network.

The above description of our invention can be implemented in a number of different hardware embodiments, each offering advantages in particular circumstances. The following description represents one such embodiment, and for purposes of this description it is assumed that the signal packets are as illustrated in FIG. 2, where the packet comprises a header portion and a data portion. The header portion contains a two-bit tag field followed by a multi-bit destination field. The destination field specifies the output port to which the packet seeks to be routed. Following the destination field, the FIG. 2 packet contains a priority field followed by a time stamp field. A header may have additional fields for purposes other than switching, and those other portions are represented in FIG. 2 by the "remainder of header" field. The data field comes last. Packets that contain data can, for example, contain "0" in both bits of the tag field, whereas packets that do not contain data (and hence have no destination or priority) advantageously contain a "0" in the first bit and a "1" in the second bit. We call such packets "blank packets".

Sort network 10 can be constructed in the manner described, for example, by Batcher in U.S. Pat. No. No. 3,428,946 issued Feb. 18, 1969, or as described by Huang et al. in U.S. Pat. No. No. 4,516,238 issued May 7, 1985.

It may be noted that for purposes of the FIG. 1 network, the "destination address" would most advantageously include the tag bits that precede the actual destination address, or at least include the second tag bit portion thereof. It may also be remembered that the condition of two mor more packets seeking connection to a particular destination is permitted. To accommodate this condition, the sorting of packets should also follow the priority field and, therefore, the sort key in the FIG. 3 embodiment should most advantageously be a concatenation of the tag bit, the destination, and the priority fields. The latter requires, however, that high priority packets have a lower binary value (in the priority field) than low priority packets. The time stamp field of incoming packets is initialized to all "1's" so its value is of no importance; and in any event, sort network 10 can exclude the time stamp field from its sort key.

Merge network 20 is also a sort network, and it can be constructed in the same general manner as is sort network 10. One difference, however, is that the input to the merge network is bitonic (ascending and descending), as described above, and that permits the merge network to be realized with fewer sort levels. The other difference lies in the sort key. Specifically, the sort key of network 20 includes the time stamp field to provide a reasoned treatment of recirculating packets (which was not included in sorter 10). This is described in more detail hereinafter.

Figure 3:
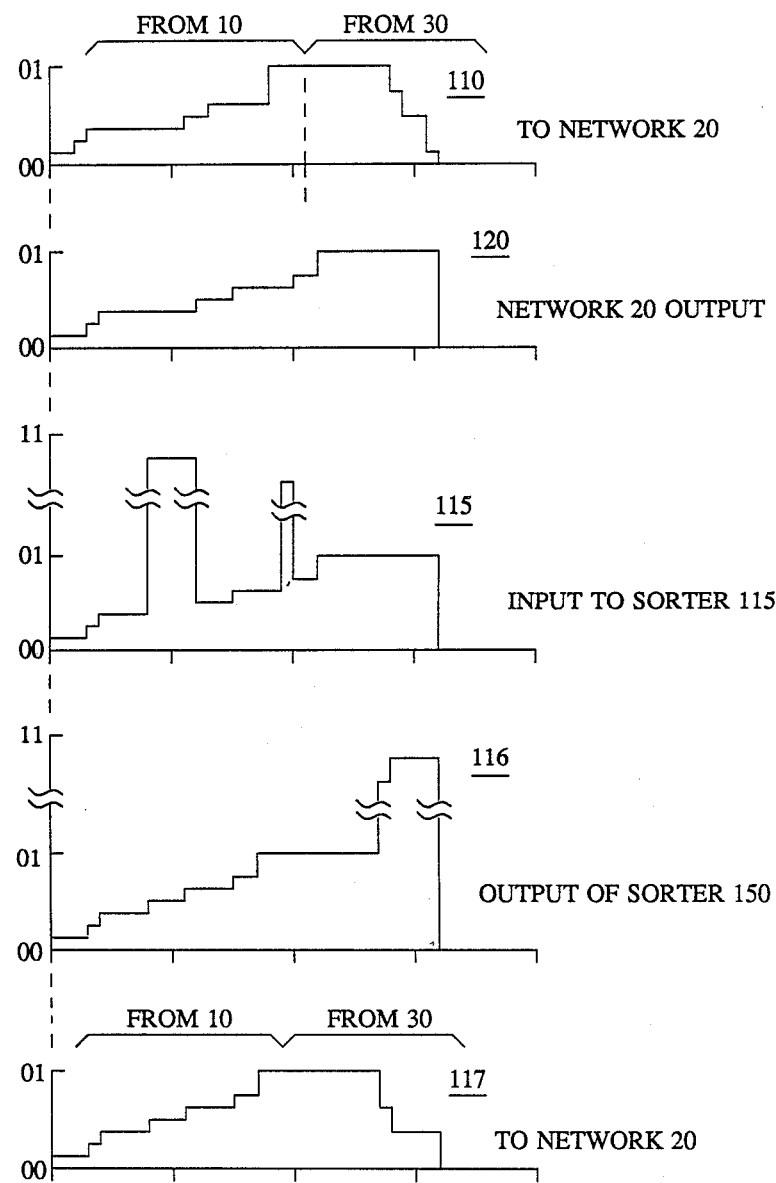
FIG. 3 diagrammatically illustrates the sortings performed within our network.

The operation of merge network 20 can be observed by persuing through the top two plots of FIG. 3, where plot 110 is the input to network 20 and the plot 120 is the output of network 20. It may be observed that the signal portion of plot 110 which is received from sort network 10 increases to the right (where the signal value represents the destination address) and ends with the value "01" (blank packets), while the signal portion received from memory 30 starts with "01" (blank packets) and thereafter decreases. The output of network 20, as depicted by plot 120, is sorted, and increasing to the right.

Figure 4:
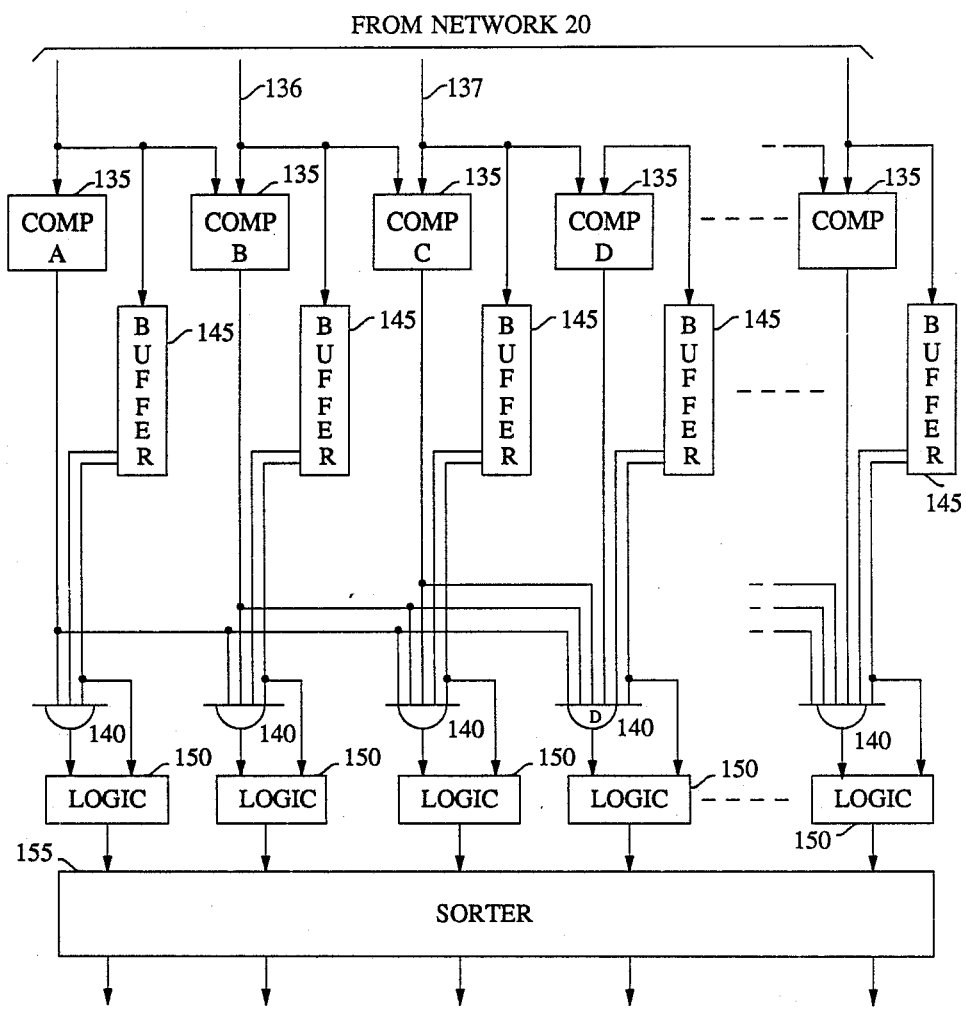
FIG. 4 presents a more detailed block diagram of trap network 40.

Referring to FIG. 1, trap network 40, accepts packets seeking connection to a particular destination, up to a selected number. It designates those packets for transmission to the expander, and it designates packets over and above the selected number, should they exist, for recirculation. This may be accomplished, as shown in FIG. 4, by a layer of comparators 135. Each output port of merge network 20 (other than the last) is connected to a first input of a comparator 135 with which it is associated and to a second input of a comparator 135 associated with the adjacent output of merge network 20 in the direction of increasing sort key value (to the right). The last output of merge network 20 is connected only to its associated comparator 135. The comparator associated with the first and left-most output of merge network 20 also has only one input. The other input is fixed at all "1's" to insure a "0" output (of course, a "0" output can be hard wired without the use of a comparator). In accordance with this connectivity approach, for example, the second output of merge network 20, line 136, is connected to comparator 135 marked B and to a comparator 135 marked C. The third output port of merge network 20, line 137, is also connected to comparator 135 marked C.

The output signal of each comparator 135 is either a "1" or a "0". It is a "1" when the destination addresses of the packets applied to the comparator are the same, and it is "0" otherwise. Comparator 135 can be constructed from Exclusive OR gates and a flip-flop. Thus, in response to a set of destination addresses 0,0,2,5,6,7,7,7,7,7,9,9,11,11,11,17 the comparators yield the output signal set 0,1,0,0,0,0,1,1,1,1,0,1,0,1,1,1,0.

The second layer in the trap network of FIG. 4 is a set of AND gates 140 and buffers 145. Again, there is a buffer 145 associated with each output of merge network 20 as well as an associated AND gate 140. Buffer 135 delays the output of merge network 20 and also provides the two tag bits to AND gate 140. Each gate 140 is also connected to its associated comparator and to a fixed number of previous adjacent comparators. This fixed number is equal to the number of packets that is permitted to be applied simultaneously to FIPO memory 60. In FIG. 4, that number is 4, and accordingly, each AND gate 140 is connected to its associated comparator and to 3 previous comparators (when they exist). For example, AND gate 140 marked D is connected to comparators A,B, C, and D. The size of buffer 145 is arranged to coincide with the completion of the comparison performed in comparators 135. At that time, the output of AND gate 140 is a "1" only if the tag bits are 00 (non-blank packet) and the two addresses applied to the relevant comparators are equal. That signal, together with the packet signal at the output of buffer 145, is applied to logic circuit 150.

For the set of signals employed above, for example, the outputs of AND gates 140 form the signal set 0,0,0,0,0,0,0,0,1,0,0,0,0,0,0.

The only "1" in the above set is associated with the fifth packet that seeks to be connected to destination "7". This fifth packet must be designated for recirculation and pushed towards the M right-most outputs of merge network 20 for connection to delay block 30 (if M is the number of inputs of block 30).

Figure 5:
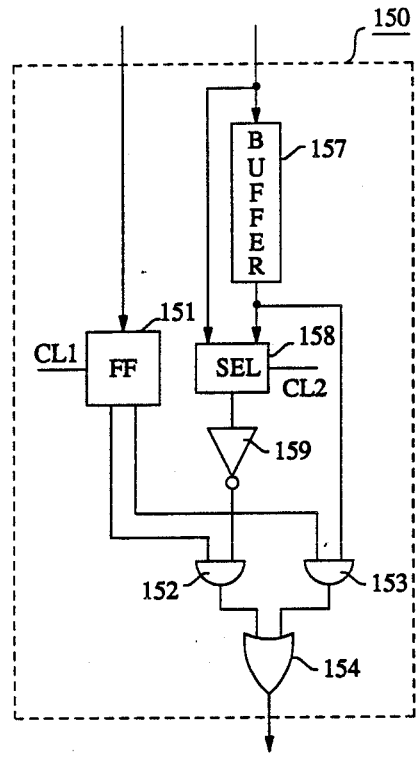
FIG. 5 depicts one realization of logic circuits 150.

To provide for this "push" capability and to insure a proper sort order at the input to memory 30, the FIG. 4 arrangement includes logic circuits 150 for inverting the bits in the sort key field of packets that need to be pushed (in the process changing the tag bits from the value 0 to the value 3). This is accomplished, as shown in FIG. 5, with inverter 159, flip-flop 151 that is clocked to capture the appropriate output of AND gate 140, and AND/OR logic gates 152, 153, and 154 that are interconnected to effect the appropriate signal selections. The results at the outputs of logic circuits 150 are shown by way of example in FIG. 3 by plot 115. Therein it may be observed that a number of packets with address 000011 (the 011 being the sought destination and 00 being the tag bits) have been converted to 11100, and a number of packets with address 000101 have been converted to 111010.

It is realized, of course, that there may be more than M packets that need to be pushed to the right, and in such a case some packets will be simply lost with the arrangement described so far. As indicated above, the selection of the maximum size of the set of packets thar is recirculated is a design choice. Nevertheless, the nature of the packets that may be lost bears scrutiny. In accordance with the description presented so far, the packets at the output of trap network 40 would be ordered by address, then by priority, and lastly by time stamp. The packets that would be lost, if any, would be the packets with the highest destination address, in reverse order of time stamp order, followed by reverse priority order, and then packets of the next lower address. Potentially, then, all of the packets of a particular address would be discarded before any packets of the next address would be subject to a cut. The problem with this situation is that some addresses will have a higher probability of transmission blockage than others. Viewed another way, very low priority packets of one destination would have preference over very high priority packets of another destination. That may be unacceptable. A more acceptable situation might be to discard packets of low priority first, then to discard packets that are very old, and lastly to discard packets by destination. This is achieved, as shown by the logic circuit 150 of FIG. 5, by reversing the order of the fields in the sort key of those packets that are destined for recirculation with buffer 157 and selector circuit 158. The resulting order of the sort key fields in the header is: tag bits, priority field, time stamp field, and destination field.

The output signals of logic circuits 150 are applied in FIG. 4 to sorter network 155. Network 155 sorts the packets by the sort key field, and that "pushes" the packets that are designated for recirculation to the right-most outputs of trap network 40. This output is depicted by plot 116 in FIG. 3.

Figure 6:
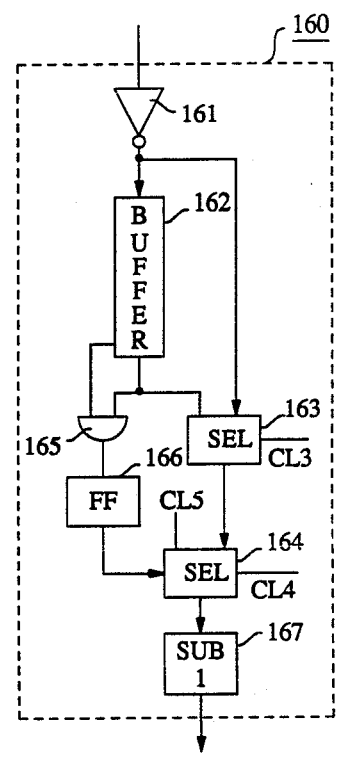
FIG. 6 depicts one realization of detection circuit 160 within delay block 30.

The packets leaving trap network 40 with tag bits "11" are destined to delay buffer 30. Accordingly, buffer 30 should accept such packets but should reject (e.g., set to blank packet condition) all other incoming packets. This is accomplished in buffer 30 through a preprocessor detection layer of logic circuits 160 illustrated in FIG. 6. Each logic circuit 160 inverts the incoming signal with inverter 161 and inputs the incoming packets into buffer 162, for reinsertion of the destination field immediately behind the tag bits. The reinsertion of the destination field is accomplished with selector 163 and an appropriate clock signal (CL3), and the output of selector 163 is applied to one input of selector 164. The other input of selector 164 receives a clock signal that generates, in effect, a blank packet. The condition of "00" tag bits is detected with AND gate 165 and flip-flop 166. Flip flop 166 controls selector 164 to select either the output signal of selector 163 or the blank packet (CL5). In addition to the reversal of the sort key field bits and the reinsertion of the destination field to its proper positon, each logic circuit 160 includes a time stamp decrementer 167. The purpose of the decrementer is to enhance probability of packets which have been recirculated a number of times, to be selected for transmission to expander 50 rather than being recirculated again. More specifically, it is intended to balance the probability of such packets over the transmission probability of packets that have been recirculated a fewer number of times. Thus, when an active packet leaves a selector 164 for the first time, the time stamp field contains all "1's" which, in a 6 bit field, for example, corresponds to 63. Following decrementer 167, the value is reduced to 62 and, accordingly, the packet with the time stamp 62 will be found to the left of the packet with time stamp 63 at the output of merge network 20 (all other fields in the sort key being equal).

Lastly, prior to providing the delay, which is the prime function of delay block 30, the outputs of logic circuit 160 are applied to a sorter (such as sorter 155) which resorts the packets applied to the delay elements in destination addresses order. The output of the sorter is applied within block 30 to a one packet delay, which, as indicated earlier, may simply be a set of shift registers, with each register storing one packet. The input/output connection of signals of buffer block 30 is such that the right-most output of merge network 40 is connected to the right-most input of buffer 30.

It may be noted in passing that the resorting described within delay block 30 can be performed within trap network 40, if it is advantageous to do so.

Figure 7:
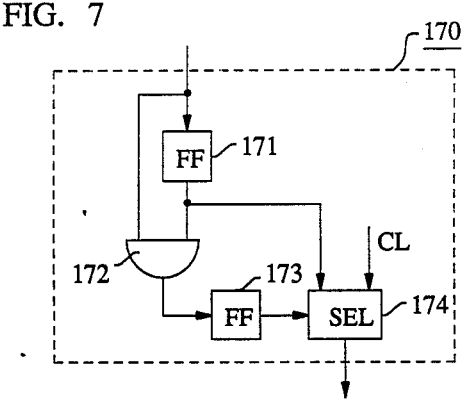
FIG. 7 depicts one realization of detection circuit 170 within expander network 50.

Whereas the packets leaving trap network 40 with tag bits "11" are destined to buffer 30, only the packets leaving trap network 40 with tab bits "00" are truly destined to expander network 50. Expander 50 must therefore also include a preprocessing logic layer, but its function is somewhat simpler than that of logic circuits 160. Specifically, logic circuits 170 preceding the expander need to detect and pass unaltered packets with tag bits "00", and block or set to blank packet condition all other packets. FIG. 7 illustrates one simple realization for logic circuit 170. It includes a flip-flop 171, an AND gate 172 and a flip-flop 173 that combine to detect and capture the "00" tag bit condition. The output of flip-flop 173 controls a selector 174 that permits transmission only of the active packets destined to expander 50.

Expander 50 can be constructed in a manner that is similar to that of the expander described in the aforementioned U.S. Pat. No. 4,516,238, where the destination control in the expander is solely the destination field. The only potential difficulty with the referenced expander design is the manner by which N outputs that seek connection to a particular destination are routed to this destination. That problem can be addressed, however, with some preprocessing circuitry. Specifically, one approach for solving the "multiple appearances" problem is to multiply the destination address by the allowable number of address occurrences and add a low significance subfield to the destination address (the sort key) which assigns a consecutive number to each occurrence of a destination address. That is, if the allowable number of occurrences is (conveniently) a binary number such as 4, the destination addresses can be multiplied by 4 (a two-bit shift in the address) and to each packet there is added a subfield with a value between 0 and 3. Thus, when there are two packets to address 17, for instance, the destination address of the first packet is converted to address 68 (4 times 17 plus 0) and the destination address of the second packet is converted to 69. A circuit that implements such subfield generation is depicted in FIG. 8, which is a collection of logic blocks 180.

Figure 8:
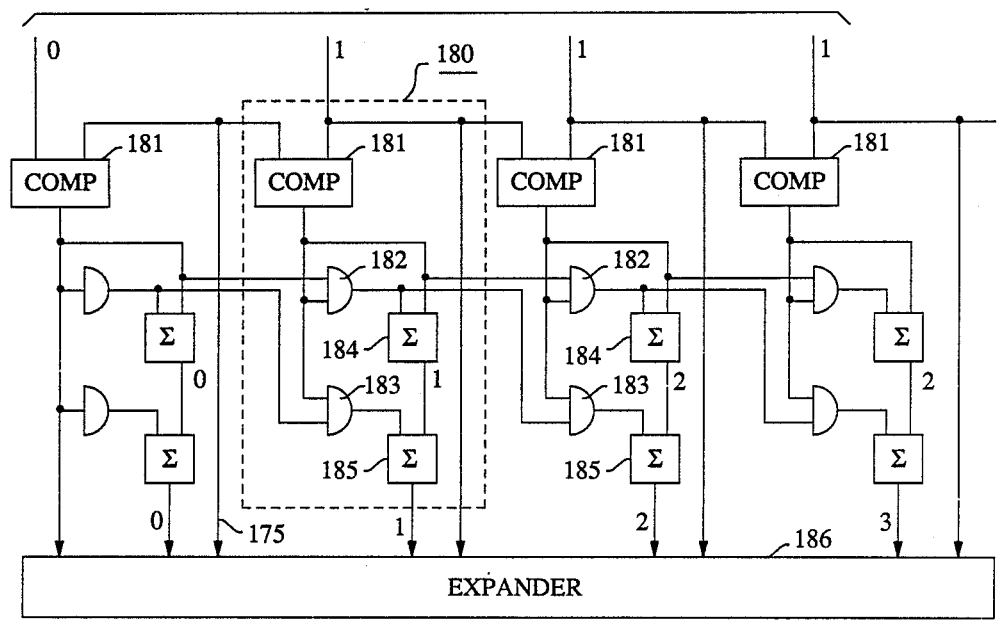
FIG. 8 illustrates one approach for developing an expander 50 output that permits more than one occurrence of a particular destination.

The input to the FIG. 8 circuit is the collection of output signals of logic circuits 170. Each input is applied to a comparator layer that is essentially identical to the comparator layer of FIG. 4. The only difference is that the output of comparators 181 of FIG. 8 is reversed from the output of the comparators of FIG. 4. The result is a sequence of "1"s and "0"s, where a "0" marks the first appearance of a particular destination address, and a "1" indicates a subsequent appearance of a particular address.

The output of a comparator 181 in a FIG. 8 logic segment 180 is connected to AND gates 182 and 183, to one input of a binary adder 184, and to an AND gate 182 in the following logic section 180. The output of AND gate 182 is connected to the second input of adder 184 and to AND gate 183 in the following logic section 180, and the output of adder 184 is connected to binary adder 185. The output of gate 183 is connected to the second input of adder 185.

To illustrate the operation of the FIG. 8 circuit, the first four logic sections 180 are shown, with an input set 0,1,1,1 at the output of the comparators. This corresponds to four appearances of the lowest value destination address. The "0" output of the first comparator propagates to the two adders of the first and second sections 180, to adder 184 of the third section 180, and to adder 185 of the fourth section 180. The output of adders 184 form the set 0,1,2,2, and the outputs of adders 185 form the set 0,1,2,3.

This output set is combined with the existing sort key appearing on lines 175 next to the adder 185 output lines, and applied to an expander network 186 constructed in a conventional manner, as indicated above.

Figure 9:
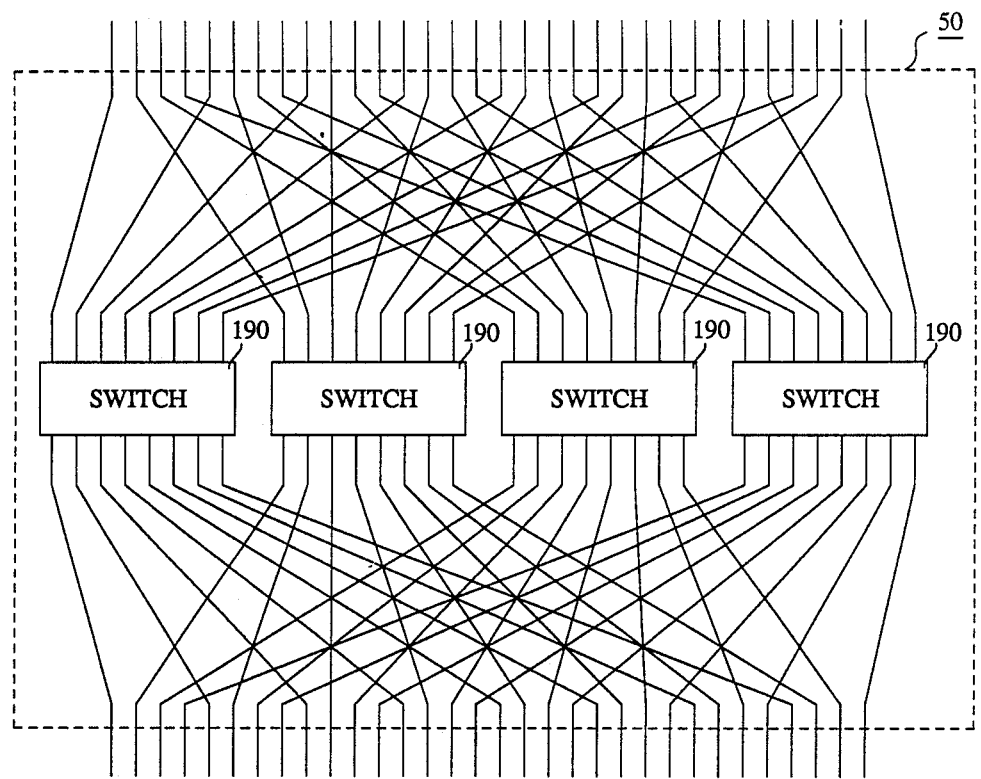
FIG. 9 illustrates another approach for developing an expander 50 output that permits more than one occurrence of a particular destination.

An alternative embodiment is shown in FIG. 9. It comprises N adjacent (in this case, four) expanders 190 that are interconnected so that the input signals are cyclically assigned to the four expanders. That is, the $1^{st}$, $5^{st}$, $9^{st}$, etc., inputs are applied to the first expander, the $2^{nd}$, $6^{st}$, $10^{st}$, etc., inputs are applied to the second expander, and so on. The outputs of the expanders are grouped and, as with the inputs, the outputs in each group are cyclically derived from the four expanders. That is, the $1^{st}$ output of the four expanders supply the $1^{st}$ group, the $2^{nd}$ output of the four expanders supply the $2^{nd}$ group, and so on. The outputs in each group are sorted on the priority and time fields in a circular manner. A four-wide merge network can set the priority to a fixed pattern.

The output of expander network 50 is applied in the FIG. 1 embodiment to FIPO memory 60. As indicated earlier, memory 60 is a "first in - priority out" memory. It can be constructed in a number of ways. One approach may be to employ a prioritized concentrator circuit like the one disclosed by A. Huang in U.S. Pat. No. 4,472,801 issued Sept. 18, 1984. Specifically, one can employ a sort network with an N+M number of inputs, where N is the number of input ports in memory 60 and M is the number of packets that memory 60 is intended to store. The sort key field in this network is the priority field of the packets and thus the sort network outputs the applied packets with the highest priority packet at one end and the lowest priority packets at the other end. The output with the highest priority is also the output of FIPO memory 60, while the next M outputs are each applied to a one packet delay element (e.g., a shift register). The outputs of the M delay elements are connected to the M inputs of the sort network, leaving N-1 outputs of the sort network unconnected. These are the overflow outputs of the FIPO memory. A slightly more complex realization that requires less hardware can be implemented by sorting (by priority) the packets that enter FIPO memory 60. This would permit using a merge network instead of a sort network.

We claim:

1. A network for routing packets that contain a destination designation and a priority designation comprising:
   a sorter responsive to applied signal packets, for developing a sorted set of packets;
   a merge network responsive to said sorted set of packets and to a delayed set of packets;
   a trap network responsive to output signals of said merge network (a) for identifying packets sets S(A), with a common destination designation where S designates the set of packets and a designates the address, and (b) for separating each of said packet sets, S(A), into a first subset, S1(A), and a second subset, S2(A), such that the number of packets in said second subset, S2(A), is zero as long as the number of packets in said first subset, S1(A), is less than a preselected number N and the priority designation of packets in said first subset, S1(A), is not lower than the priority designation of packets in said second subset, S2(A);
   a delay network responsive to outputs of said trap network, for developing said delayed set of packets;
   an expander network having N of appearances of each destination address responsive to output signals of said trap network, for routing packets of said first subsets in accordance with destination addresses of routed packets; and
   a plurality of memory means, each having an output and N inputs connected to said appearance of a chosen destination at the output of said expander, for delivering packets to said output.

2. The network of claim 1 where said trap network (a) identifies packets sets with a common destination designation, (b) separates each of said packet sets into said first subset and said second subset, and (c) groups packets of said second subsets at the output of said trap network.

3. The network of claim 1 where said trap network comprises means for adding a tag designation to packets that are destined to said delay network to form tagged packets.

4. The network of claim 3 where said trap network further includes means for sorting tagged packets by priority.

5. The network of claim 4 where said trap network further includes means for identifying a chosen number of highest priority packets among the sorted tagged packets and means for sorting said chosen number of highest priority packets by destination.

6. The network of claim 4 where said delay network comprises:
   means for accepting a chosen number of highest priority packets among the sorted tagged packets; and
   means for sorting said chosen number of highest priority packets by destination.

7. The network of claim 1 where said delay means includes means for identifying a selected portion of said packets passing through said delay means as a time-stamp field, and for altering the contents of said time-stamp field to indicate passage of said packets passing through said delay means; and said trap network combines priority and time-stamp fields in determining said separating each of said packet sets into a first subset and a second subset.

8. The network of claim 1 wherein each of said memory means delivers packets to its output by order of priority of packets provided to said memory means.

9. A communications switch for switching variable precedence input data messages to respective ones of a plurality of destinations, comprising:

means for aggregating currently received messages with previously received messages that have not been forwarded to their respective destinations, to form a set of aggregated messages;

means for selecting, for each destination, the N messages having the highest precedence from among the aggregated messages having said each destination, where N is a preselected number greater than 1;

means for storing the T highest precedence messages from among the aggregated messages not selected by said means for selecting, where T is another preselected number, thereby making the stored messages available for later aggregating by said means for aggregating; and means for transmitting the selected messages to respective destinations in order of precedence.

* * * * *